Nov. 13, 1928.

C. H. YOUNG

TRUCK

Filed Nov. 10, 1925    2 Sheets-Sheet 1

1,691,621

Inventor:
Clarence H. Young,
by Emery Booth Janney & Varney
Attys.

Nov. 13, 1928.  1,691,621
C. H. YOUNG
TRUCK
Filed Nov. 10, 1925   2 Sheets-Sheet 2
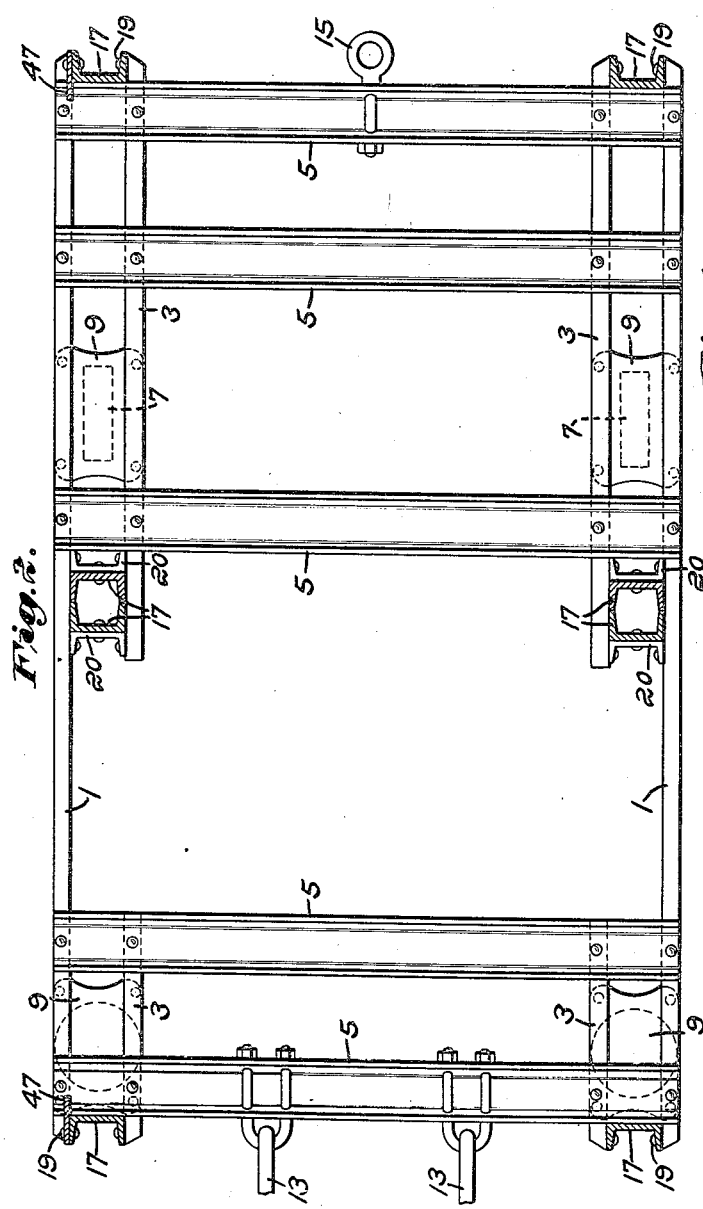
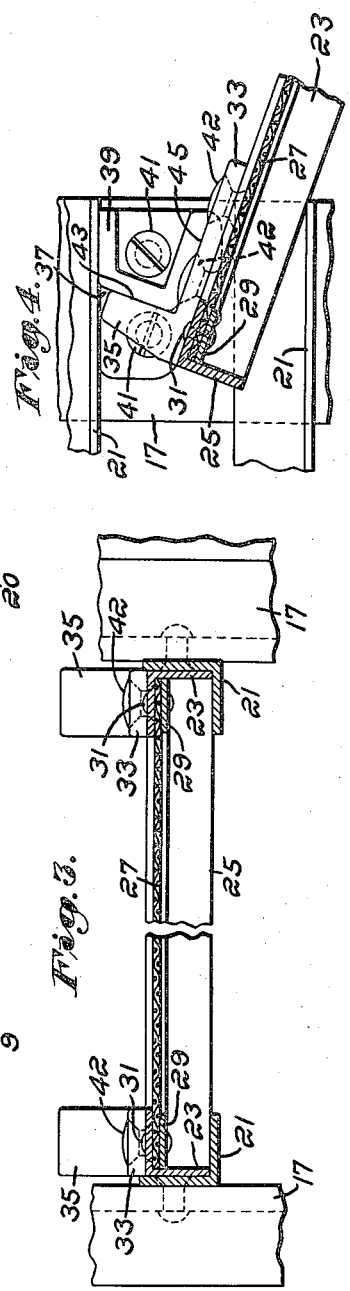
Inventor:
Clarence H. Young,
by Emery Booth Janney & Varney
Attys.

Patented Nov. 13, 1928.

1,691,621

UNITED STATES PATENT OFFICE.

CLARENCE H. YOUNG, OF BOSTON, MASSACHUSETTS.

TRUCK.

Application filed November 10, 1925. Serial No. 68,162.

My invention relates to article handling apparatus and particularly to a truck for use in handling and cooling hot batches of rubber.

My invention will be best understood from the following description when read in the light of the accompanying drawings of one specific embodiment of my invention selected for illustrative purposes, while the scope of my invention will be more particularly pointed out in the appended claims.

In the drawings:—

Fig. 2 is a plan view of the base of the truck showing the vertical posts in section;

Fig. 3 is a section on the line 3—3 of Fig. 1; and

Fig. 4 shows a detail.

Figure 1:
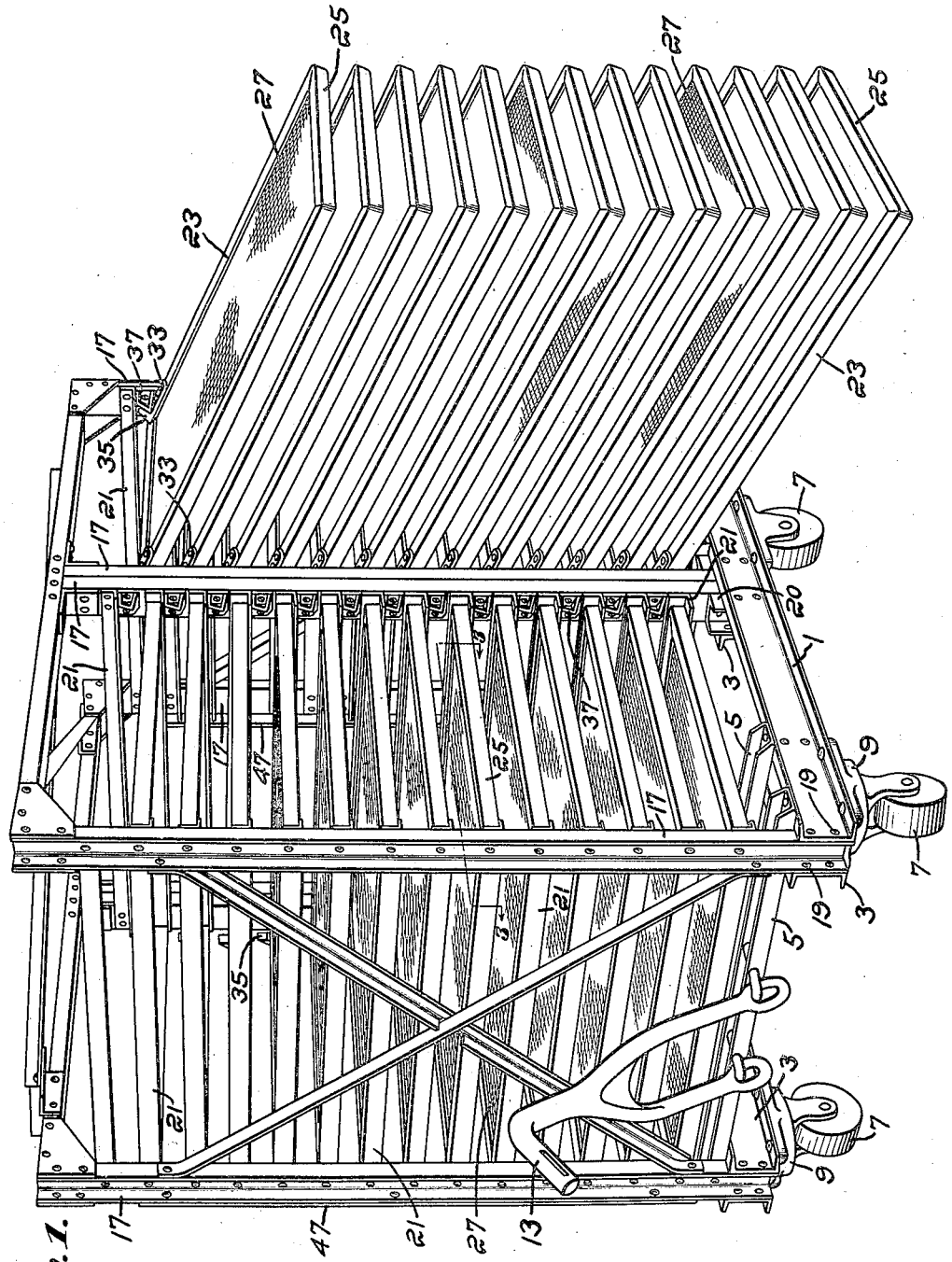
Fig. 1 is a perspective view of a truck constructed according to my invention and shows one bank of trays in pulled out position.

Referring to the submitted embodiment of my invention illustrated in the drawings I have shown a base which comprises channel shaped girder members at opposite sides of the truck, which girder members herein are in the form of channel-irons 1, the webs of which are placed vertically. In parallel relation to the channel-irons 1 at each side of the truck I have shown second girder members in the form of channel-irons 3 likewise having their webs positioned vertically. If desired the channel-irons 3 may extend the entire length of the truck, but conveniently they may be in two sections each extending part way the length of the truck as illustrated in Fig. 2 of the drawings. Herein I have provided transverse channel-irons 5 which extend across the base of the truck with their webs horizontally disposed and in contact with the upper flanges of the channel-irons 1 and 3 to which they are riveted.

For supporting the truck I have herein provided casters having the wheels 7 and the bases 9, the latter of which are bolted as is indicated at 11 to the lower flanges of the channel-irons 1 and 3. As illustrated one pair of casters is situated at the end of the truck, these conveniently being of the swivel type, while the other pair of casters is situated inwardly from the opposite end of the truck as clearly illustrated in Fig. 2 so that the truck may be turned on a short radius. As illustrated I have provided the truck with a draw-bar or handle 13 secured to one of the end channel-irons 5 and at the opposite end of the truck a coupling member 15 secured to the other end channel-iron 5 so that the truck may be pushed or pulled from place to place. If desired the casters may be omitted, in which case the lower flanges of the channel-irons 1 and 3 may be permitted to support the truck, allowing an elevating type truck to be slid into the space between the floor and the bottoms of the channel-irons 5 for the purpose of raising the device and carrying it about.

As illustrated I have provided vertical posts carried by the base of the truck, which posts herein are in the form of channel-irons, the ends of which are positioned between the webs of the channel-irons 1 and 3. As shown the end posts or channel-irons 17 are secured to the base by bolts or rivets 19 extending through the flanges of the channel-irons 17 and the webs of the channel-irons 1 and 3, while the webs of the center posts are riveted or bolted to the webs of short channel-brackets 20, the flanges of the latter being riveted or bolted to the webs of the channel-irons 1 and 3. Herein the webs of the end channel irons 17 face the webs of the channel-irons 17 adjacent the center of the truck, the edges of the flanges of these later channel-irons abutting.

Extending between the corresponding posts or channel-irons 17 at the opposite sides of the truck I have shown bars in the form of angle-irons 21 having one of their webs vertically positioned against the webs of the channel-irons 17 and riveted or bolted thereto.

On the horizontal flanges of the angle-irons 21 I have illustrated trays. Each tray may consist of a rectangular frame composed of side angle-irons 23 and end angle-irons 25, the edges of the vertical webs of the angle-irons 23 being supported upon the horizontal webs of the angle-irons 21 as clearly indicated in Figs. 1, 3 and 4. Supported by the angle-irons 23 and 25 is the floor 27 of the tray, which floor perferably is foraminous, as for example it may be made of perforated plates or wire-mesh, the latter being indicated in the drawings. For securing the wire-mesh to the angle-irons 23 and 25 I have herein illustrated flat bars 29 which are coextensive with the horizontal webs of the angle-irons 23 and 25 and are secured thereto by rivets 31.

Herein the trays are slidably mounted on the shelves or guides afforded by the horizontal webs of the angle-irons 21. I have illustrated the ends of the angle-irons 23 as carrying brackets 33 each of which has the upstanding portion 35, and have shown the posts 17 at one side of the truck as carrying brackets 37 each of which has a portion 39 projecting outwardly from the post so as to coact with the upstanding portion 35 of a corresponding bracket 33. Conveniently the bases of the brackets 37 may be secured to the webs of the posts 17 by means of flat headed screws 41 as indicated in Fig. 4, and the bases of the brackets 33 to the angle-irons 23 by rivets 42. As illustrated the projecting portion 39 of the bracket 37 has angularly disposed sides 43 and 45, the former of which coacts with the upstanding portion 35 of the bracket 33, while the latter of which coacts with the base of the bracket 33.

With the above described construction when the trays are slid from between the posts the weight of the trays causes them to tilt, the edges of the vertical webs of the angle-irons 23 when the trays are tilted (Fig. 4) resting against the end edges of the horizontal webs of the angle-irons 21, while the upstanding portion 35 of the bracket 33 rests against the bevel face 43 of the bracket 37, and the base of the bracket 33 rests against the bevel face 45 of the bracket 37. When the trays are in tilted position and are slid inwardly the upper edges of the upstanding portions 35 of the brackets 33 will slide along the bottoms of the horizontal flanges of the angle-irons 21 above the respective trays, which act to swing the trays toward their horizontal positions until the trays are slid in, say approximately half way, when the weight of the trays will cause them to tilt toward the horizontal until they rest on the horizontal webs of the angle-irons 21 normally supporting them.

The coacting brackets 33 and 37 act as a stop to prevent outward sliding movement of the trays. Acting as a stop to prevent inward sliding movement of the trays I have herein provided the end posts 17 at that side of the tray opposite the posts carrying the brackets 37 with flat bars 47 riveted to the outside flanges of the posts 17 and projecting beyond the webs of the posts.

It will be observed that I have herein provided a truck which comprises an open framework carrying a plurality of banks of trays, each bank consisting of a plurality of foraminous trays in spaced superimposed relation, the trays being movable relatively to each other and to the framework, and that when the trays are slid inwardly between the posts they are held in horizontal position, while when they are slid outwardly from between the posts they assume a position inclined from the horizontal.

A truck constructed as above described is particularly useful in the rubber industries for economic handling and cooling of hot batches of rubber. In operation all the trays of a bank of trays will be pulled out as indicated in Fig. 1. They are then ready for receiving the rubber from the mill, which rubber is placed on the trays beginning at the top. As each tray is loaded it is slid in, this process continuing until all the trays of the bank are filled. Conveniently the truck will be constructed with sufficient banks of trays to handle all the rubber handled by the mill in one operation, this amount of rubber being known in the rubber industries as a "batch". When the trays are thus loaded they may be removed to the cooling room where after remaining until the rubber has cooled they may be removed to the storage room. I have found that with the use of a truck constructed according to my invention a material saving in time and labor costs is effected, heretofore it having been necessary to lay the hot sheets of rubber from the mill upon tables and remove the sheets from time to time to the cooling rooms. Also to secure best results in rubber manufacture the rubber should be cooled as shortly as possible after leaving the mill to prevent what it known as "burning" of the rubber. A rack constructed according to my invention permits circulation of air and allows the rubber to cool more quickly than has been possible with prior apparatus used in connection with the rubber industry.

Although I have described for purposes of illustration one specific embodiment of my invention it is to be understood that within the scope of my invention wide deviations may be made therefrom without departing from the spirit of my invention.

Claims—

1. A truck of the character described, having in combination, a base comprising girder members at opposite sides of the truck, each girder member comprising a pair of spaced structural steel members having vertically disposed parallel webs, spaced vertical posts supported by said girder members, said posts being between said parallel webs and each having parallel flanges abutting with and secured to said parallel webs, bars extending from the posts at one side of said truck to the posts at the opposite side of the truck, and trays slidably supported on said bars.

2. A truck of the character described, having in combination, a base comprising girders at opposite sides of the truck, each girder comprising a pair of spaced structural steel members, two sides of each member being at right angles to each other and one of said sides of each being vertically disposed, structural steel posts at opposite sides of the truck and carried by said girders, said vertically disposed sides of said members abutting with and secured to one of the sides of said posts, said posts having other sides at right angles to the last mentioned sides with those of opposite posts in the same plane, spaced superimposed bars secured to said other sides of said posts, and trays slidably supported on said bars.

3. A truck of the character described, having in combination, a base comprising a pair of channel-shaped girder members at each side thereof, said girder members having their webs in spaced parallel vertical planes, channel-irons at opposite sides of said base and supported in vertical position between the girder members of said pairs of girder members with their flanges secured to the webs of said girder members, the webs of said channel-irons in pairs facing each other, angle-irons carried by said channel-irons in superimposed spaced relation, said angle-irons extending across said truck from the channel-irons at one side thereof to channel-irons at the opposite side thereof and having vertically arranged webs secured to the webs of said channel-irons, and trays slidably supported at opposite sides thereof on the horizontal webs of said angle-irons.

4. A truck of the character described, having in combination, a base comprising girders at opposite sides thereof, each girder having a pair of spaced structural steel members, said members each having sides at right angles to each other, one of said sides being horizontally disposed and the other vertically disposed, said horizontal sides being in the same plane, posts secured to said vertically disposed sides, trays supported on said posts, and wheeled supports for said truck having bases secured to pairs of said horizontally disposed sides.

5. A truck of the character described, having in combination, a base comprising girders at opposite sides thereof, each girder having a pair of spaced structural steel members, said members each having sides at right angles to each other, one of said sides being horizontally disposed and the other vertically disposed, said horizontal sides being in the same plane, posts between and secured to said vertically disposed sides, trays supported on said posts, and wheeled supports for said truck having bases secured to pairs of said horizontally disposed sides.

In testimony whereof, I have signed my name to this specification.

CLARENCE H. YOUNG.